(12) United States Patent
Morris

(10) Patent No.: US 10,757,041 B2
(45) Date of Patent: Aug. 25, 2020

(54) FULL SERVER-LEVEL REDUNDANCY USING A SINGLE NETWORK INTERFACE CONTROLLER(NIC) AND A SINGLE NIC CARD

(71) Applicant: Hewlett Packard Enterprise Development LP, Houston, TX (US)

(72) Inventor: Terrel Morris, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/208,423

(22) Filed: Dec. 3, 2018

(65) Prior Publication Data

US 2020/0177525 A1  Jun. 4, 2020

(51) Int. Cl.
*H04J 3/14* (2006.01)
*H04L 12/939* (2013.01)
*H04L 12/24* (2006.01)
*H04L 12/50* (2006.01)
*H04L 12/707* (2013.01)

(52) U.S. Cl.
CPC ............ *H04L 49/552* (2013.01); *H04L 12/50* (2013.01); *H04L 41/0681* (2013.01); *H04L 45/22* (2013.01)

(58) Field of Classification Search
CPC ............ H04L 12/2624; H04L 12/2629; H04L 12/2655
USPC ................................. 370/216–220, 242, 244
See application file for complete search history.

(56) References Cited

U.S. PATENT DOCUMENTS

| | | | |
|---|---|---|---|
| 6,796,716 B1 | 9/2004 | Handforth et al. | |
| 7,359,317 B1* | 4/2008 | DeCesare | H04L 69/40 370/219 |
| 7,388,874 B2* | 6/2008 | Cameron | H04L 69/40 370/419 |
| 7,818,387 B1* | 10/2010 | King | G06F 11/0766 709/208 |
| 8,200,097 B2 | 6/2012 | Cole | |
| 8,315,057 B2 | 11/2012 | Xu et al. | |
| 8,358,934 B2 | 1/2013 | Hinderthuer et al. | |

(Continued)

OTHER PUBLICATIONS

Farrington, N.; "Helios: a Hybrid Electrical/optical Switch Architecture for Modular Data Centers"; Jan. 2011; 12 pages.

(Continued)

*Primary Examiner* — Dmitry Levitan
(74) *Attorney, Agent, or Firm* — Sheppard Mullin Richter & Hampton LLP

(57) ABSTRACT

Systems and methods for providing full redundancy in a computing network using a single network interface controller (NIC) and a single NIC card within one or more computing devices (e.g., servers) are provided. Embodiments of the technology disclosed herein provide a NIC card with a processing device (e.g., a field-programmable gate array (FPGA)) having a first set of input pins associated with a primary network switch and a second set of input pins associated with a standby network switch. When a failure occurs on the primary network switch, the processing device of the NIC card is configured to perform a circuit switch action to switch the connection between a processing device output from the first set of input pins to the second set of input pins. Accordingly, the same NIC is capable of controlling the network interface of a computing device between to different network switches.

12 Claims, 12 Drawing Sheets

(56) References Cited

U.S. PATENT DOCUMENTS

| | | | |
|---|---|---|---|
| 8,503,879 | B2 | 8/2013 | Xu et al. |
| 9,013,977 | B2 * | 4/2015 | Singh ................... H04B 10/032 |
| | | | 370/217 |
| 9,088,119 | B2 | 7/2015 | Baker |
| 9,363,208 | B1 * | 6/2016 | Judge ..................... H04L 49/15 |
| 9,391,706 | B2 | 7/2016 | Lewis et al. |
| 9,491,084 | B2 * | 11/2016 | McGee ............... H04L 43/0811 |
| 9,553,689 | B2 | 1/2017 | Kato et al. |
| 9,585,032 | B2 * | 2/2017 | Thyni .................... H04B 10/40 |
| 9,654,852 | B2 * | 5/2017 | Yin .................... H04Q 11/0062 |
| 9,742,698 | B2 * | 8/2017 | Namihira ............ H04L 43/0811 |
| 9,894,427 | B2 | 2/2018 | Sindhu et al. |
| 9,965,433 | B2 | 5/2018 | Tomada |
| 10,303,640 | B2 * | 5/2019 | Oprea .................. G06F 13/4068 |
| 2004/0195944 | A1 | 10/2004 | Sugihara |
| 2005/0282413 | A1 | 12/2005 | Israel et al. |
| 2012/0008945 | A1 | 1/2012 | Singla et al. |
| 2012/0321309 | A1 | 12/2012 | Barry et al. |
| 2014/0169499 | A1 | 6/2014 | Riani et al. |
| 2014/0205243 | A1 | 7/2014 | Baker |
| 2015/0086214 | A1 | 3/2015 | Lewis et al. |
| 2015/0237421 | A1 | 8/2015 | Morgan et al. |
| 2016/0091685 | A1 * | 3/2016 | Raza ..................... G02B 6/4452 |
| | | | 398/19 |
| 2016/0342563 | A1 | 11/2016 | Tomada |
| 2017/0134836 | A1 | 5/2017 | Sindhu et al. |
| 2018/0027313 | A1 | 1/2018 | Adiletta et al. |
| 2018/0181502 | A1 * | 6/2018 | Jen ...................... G06F 13/4022 |
| 2018/0191115 | A1 | 7/2018 | Khazen et al. |
| 2018/0375577 | A1 | 12/2018 | Leigh et al. |

OTHER PUBLICATIONS

Finisar Demonstrates New 400G, 200G and 100G Pluggable Optical Modules and Introduces Flexgrid® Single Low Profile Wavelength Selective Switch at OFC 2017, Mar. 21, 2017, http://investor.finisar.com/news-releases/news-release-details/finisar-demonstrates-new-400g-200g-and-100g-pluggable-optical>.

Lugones, D., et al; "A Reconfigurable Optical/Electrical Interconnect Architecture for Large-scale Clusters and Datacenters"; May 15-17, 2012; 10 pages.

Yan, F., et al.; "HiFOST: a scalable and low-latency hybrid data center network architecture based on flow-controlled fast optical switches"; Jul. 13, 2018; 14 pages.

Bradley J. Booth., "Optical Interconnect for Volume Servers", OFC/NFOEC Technical Digest, Optical Society of America, 2013, 3 pages.

D'Ambrosia et al., "Considerations for 25GbE", IEEE 802.3 25GbE Study Group, Sep. 2014, pp. 1-14.

Extended European Search Report received for EP Patent Application No. 19190092.7, dated Feb. 26, 2020, 7 pages.

Scott Kipp, "Multi-Port Implementations of 50/100/200GbE", Ethernet Alliance, IEEE Draft, vol. 802.3, May 22, 2016, 20 pages.

* cited by examiner

FULL SERVER-LEVEL REDUNDANCY USING A SINGLE NETWORK INTERFACE CONTROLLER(NIC) AND A SINGLE NIC CARD

BACKGROUND

As numbers of computers, particularly servers, are deployed in large-scale or hyper-scale data center applications, the need to connect those computers to one another at massive scale as well as connecting them to the outside world has driven change in data center networking topologies and strategies. Two of the primary drivers of cost and performance in these large networks are the network topology and the photonic interconnections between them. The trend has been to utilize many low-cost, low-radix switches that are connected to other low-radix switches via many connections, both copper and optical.

As the networks increase efficiency by increasing data rate, the distances that can be traversed by copper cables are diminished. As a result, cost-reduction exercises have developed high-channel-count solutions that amortize the cost of cable attachment and packaging across a larger number of connections. Where current solutions may use optical engines with 4 channels or perhaps 8 channels, these high-density solutions favor 24-36 channels.

Taking 24-channel or 36-channel cables directly to computer servers is not efficient due to overprovisioning. Likewise, taking 4-channel solutions to many servers is not efficient due to duplicative packaging costs. As more networks seeks to use high-radix switches in order to remove layers from the network hierarchy, they are challenged by the costs of the final layer connection to the servers. Since the connections between a high-radix middle-of-row (MOR) switch and a large array of servers requires making many connections, and those servers are in different equipment racks, the problem of requiring the distance capabilities of optical connections is conflated with the problem of requiring low-cost connections to many servers.

There is an additional complexity having to do with bandwidth and data rate. The chips generally used in the network switches tend to utilize 50 gigabyte (50G) pulse amplitude modulation with 4 encoding levels (PAM-4 I/O) structures. At the server level, the network interface controller (NIC) card generally includes a network acceleration field programmable gate arrays (FPGA) run at 25G non-return to zero (NRZ). Therefore, a 2:1 data rate ratio is needed between the network switch and the server. This is commonly accomplished by use of retime and/or gearbox devices that accommodate high data rate on one side and provide twice as many channels at half the data rate on the other side.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
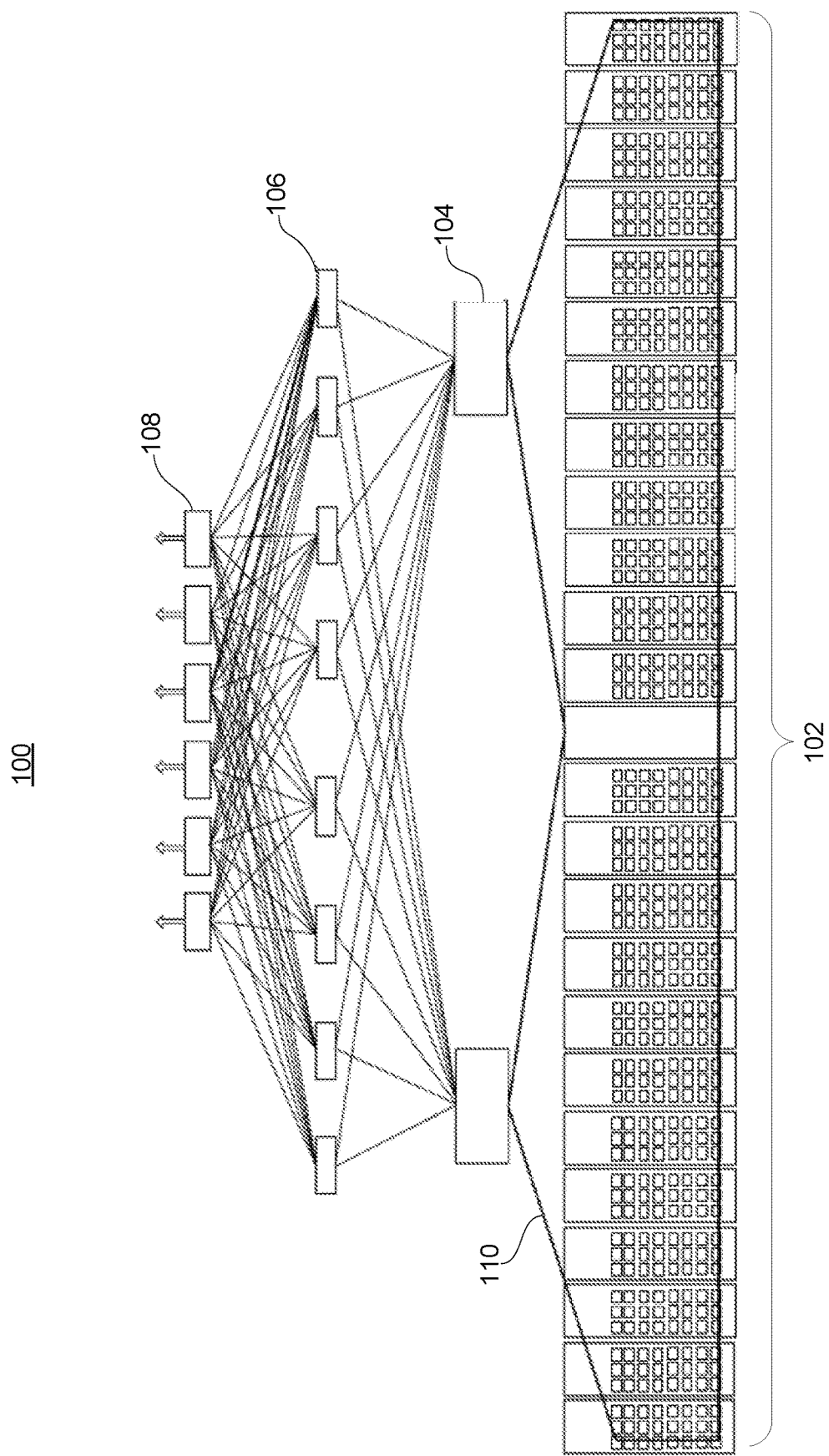
FIG. 1 illustrates an example hyper-scale architecture in which embodiments of the technology disclosed herein may be implemented.

The figures are not exhaustive and do not limit the present disclosure to the precise form disclosed.

DETAILED DESCRIPTION

Redundancy increases the impact of the large number of connections required between MOR switches and an array of servers. If an array of servers is only connected to a single MOR switch, and the MOR switch fails, the impact is that all servers in that array will be deprived of network access and will fail. If that array consists of a large number of servers, for example multiple racks of 24 servers, hundreds of servers are at risk of failure due to a single MOR switch outage. Redundancy at the switch level utilizes two MOR switches, each connected to the array of servers. When a large array of servers is directly connected to and served by two or more MOR switches, for purposes of redundancy and network resilience, there is need for redundant connections at all points between the network switch and the server. This is commonly referred to as dual-homing, where a server has two independent paths, one to each switch. These are commonly referred to switch "A" and switch "B" in architectural notation.

Dual-homing essentially duplicates the path from the network switch level to the server level. That is, in a fully-redundant network, dual connections means: two independent photonic connections between the MOR switches and the server; two independent conversions from photonic to electrical signaling; two independent network acceleration field programmable gate arrays (FPGAs); two independent network interface controller (NIC); two sets of connection circuitry from each NIC to the server. In short, for each server, two NIC cards, containing a NIC and FPGA, will be required. Each of the two cards would host connectors, such as variations of a small-form factor pluggable (SFP) connector (e.g., quad SFP (QSFP)), for connecting an optical cable to each switch, one optical cable from each server.

This increases the hardware requirements of the network. For example, if a rack contains 24 servers, full redundancy would require: 48 optical cables (e.g., 4-channel (Quad) photonic cables; 48 NIC cards, each containing one FPGA and one NIC, and retimer and/or gearbox chips to transition from two lanes of 50G to 4 lanes of 25 G; a server design capable of supporting two NIC cards in terms of communication circuitry (e.g., peripheral component interconnect express (PCIe)), space requirements, thermal requirements; and power requirements.

One of the key attributes to be considered when evaluating any alternative network architecture is the fault zone incurred by any single failure. For example, if the network is not redundant, and has a single switch and single connections to each server, then the impact of a switch fault is the loss of connectivity to all servers, which would result in a catastrophic data center event. The impact of a failed photonic interconnection would be the loss of connectivity to a single server, which would result in much less impact to data center operations. The impact of a failed NIC card would also be the loss of connectivity to the single impacted server.

In the fully redundant architecture described above, the impact of a switch failure would be non-existent, since there are two fully-connected switches. Likewise, the impact of a failed photonic connection would be covered by redundant paths, and finally the impact of a failed NIC card would be non-existent, since there are two duplicate NIC cards. Therefore, to attain full redundancy in traditional networks utilizing high-radix MOR switches doubles the cost of the network and the power consumption. Since very large computer installations, such as hyper-scale data centers, are very cost-sensitive and power-sensitive, the duplication costs render this traditional approach untenable for many applications. Even at the enterprise level cost and power consumption is a top concern. The need to duplicate the system further limits the scalability of the network.

In Hyperscale computing operations, it is customary to have a very large number (hundreds of thousands or even millions) of servers active, available, and therefore network-connected at any one time. It is common in such operations to start with a base unit of servers, for example a row of racks containing many servers per rack, and to scale that number up by replicating the row (sometimes also referred to as a pod). Using this methodology, it is possible to control the overhead of server management software by means of replication, with all pods alike. Since such a pod may contain on the order of 500-1000 servers, it is important that the per-server cost be closely controlled.

If traditional dual homing is utilized, with a NIC card per path, then the NIC card cost is doubled per server, and that cost is then multiplied by the number of servers in a row or pod. The cost is again multiplied by the number of rows or pods in service. For a data center housing 500,000 servers, the cost (for example $150) per card is then scaled up to $75M. If the cost of the additional card can be avoided, as well as the cost of independent optical cables, as well as the cost of doubled interconnect power, the aggregate cost savings can easily reach multiple hundreds of millions of dollars. There is thus a need in the art for redundant functionality at lowest possible cost.

Embodiments of the technology disclosed herein provide systems and methods for providing the benefits of a fully redundant architecture without the need for duplication of all the hardware components. In various embodiments, a single NIC card is capable of connecting to both MOR switches. An FPGA on the NIC card is configured to differentiate between the data channels from the two MOR switches. The FPGA sets one MOR switch as the "primary channel" and the other as the "standby channel". During operation, the FPGA will route the data from the primary channel to the NIC for processing, and will also route other networking-acceleration functions to the primary channel as if this were the only connection. When, after an appropriate time interval, the FPGA no longer senses data on the primary channel, it is configured to switch over to the standby channel and begin to route the data on the standby channel (from the second MOR switch). Implementation of the technology of the present disclosure reduces the number of NIC cards required to provide redundancy, simplifying server design and reducing the number of cable connections required. The responsibility of switching between two potentially live data sources when redundantly connected can be moved down to the server-level, greatly reducing the need for duplicate hardware for redundancy purposes.

A person of ordinary skill in the art would understand the technology disclosed herein is applicable in networks utilizing a standard-defined cable. Non-limiting examples of such networks include: Ethernet; Omni Path (OPA); Gen-Z; Infiniband; among others.

FIG. 1 illustrates an example hyper-scale architecture 100 in which embodiments of the technology disclosed herein may be implemented. Although FIG. 1 is at hyper-scale, a person of ordinary skill would understand that the technology of the present disclosure is applicable to any network architecture. As illustrated in FIG. 1, the servers 102 are connected directly to middle-of-row (MOR) switches 104, which are connected to leaf switches 106, which are connected to the core switches 108. In this example architecture the majority of the switching has been translated into the redundant high-radix MOR switches 104, each of which connects directly to all of the servers 102. However, this configuration requires the connections to span approximately fifteen meters to connect the various components, which is challenging to accomplish with copper connections and not cost effective to do with photonic (optical) connections due to the sheer number of connections required. For example, in the illustrated hyper-scale architecture 100, a total of 1,152 connections are required (576 primary connections and 576 backup/redundant connections to connect the 576 stacked servers).

Due to the large number of connections that would need to be shown, the connections from each MOR switch 104 to all of the servers 102 is represented by the outline 110. Although each and every connection is not shown, a person of ordinary skill in the art would understand that the outline 110 symbolically represents all 1,152 connections in FIG. 1.

The sheer number of connections required illustrates the scalability issues with current approaches. The traditional architecture requires servers with two separate NIC cards installed, one to connect with each of the MOR switches 104, in order to provide full redundancy.

Figure 2:
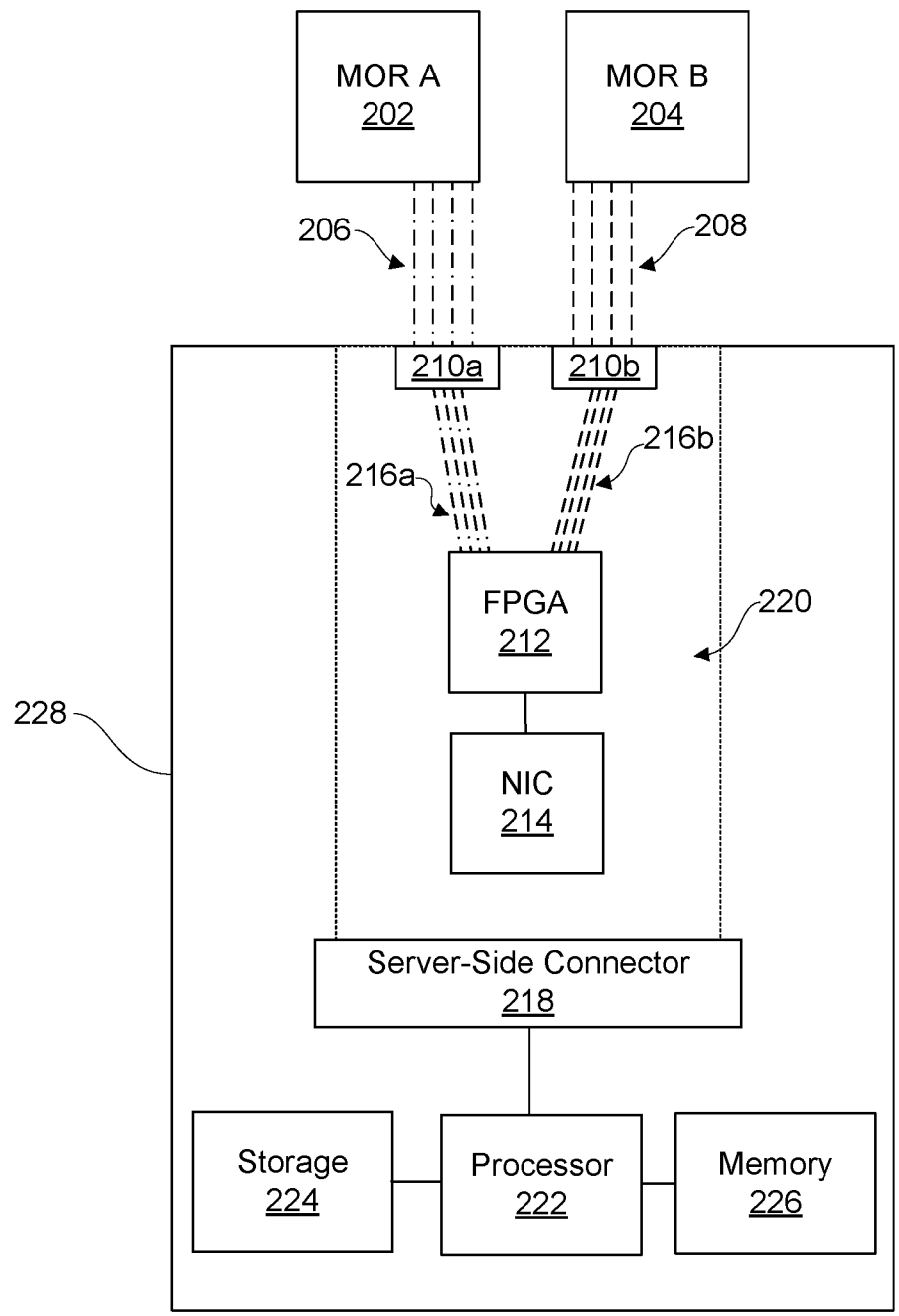
FIG. 2 illustrates an example network architecture with an example redundant NIC card in accordance with embodiments of the technology disclosed herein.

The present disclosure provides a method of reducing the total number of NIC cards and connections necessary to achieve full redundancy. FIG. 2 illustrates an example network architecture 200 with an example redundant NIC card 208 in accordance with embodiments of the present disclosure. The illustrated example has been simplified for ease of discussion, with component sizes and positioning exaggerated. The absence of a common component for any of the devices (e.g., a server) in FIG. 2 should not be interpreted as limiting the scope of the subject matter. A person of ordinary skill in the art would know how to implement the technology in a server and how to implement other common components of devices.

Referring to FIG. 2, two MOR switches—MOR A 202 and MOR B 204—are connected to a server 228 through an example redundant NIC card 220. In various embodiments, MOR A 202 and MOR B 204 are high-radix MOR switches. Although multiple outputs are included in the MOR switches 202, 204, for ease of discussion the example of FIG. 1 illustrates one connection 206, 208 from MOR A 202 and MOR B 204, respectively. In various embodiments, the connections 206, 208 may be standard optical cables. In such embodiments, the connectors 210a, 210b may include a photonics module to convert optical signals to electrical signals, while in other embodiments a separate photonics module may be included between MOR A 202 and MOR B 204 and the connectors 210a, 210b, respectively. In various embodiments the connections 206, 208 may be active optical cables (ADCs) that include optical-to-electrical conversion capabilities on the cable ends. As a non-limiting example, where a rack contains 24 servers 228, MOR A 202 and MOR B 204 would each have 24 separate outputs, one for each of the servers 228.

As illustrated, the connections 206, 208 represent quad small form-factor pluggable (QSFP) connections, with 4 channels in each connection 206, 208. The bandwidth of each channel depends on the implementation. As a non-limiting example, MOR A 202 may be a high-radix switch capable of outputting the multiple instances of 50 gigabyte data channels required to connect to roughly 500 servers, and connection 206 can link 4×50 gigabyte data channels to connector 210a. Although discussed with respect to QSFP connections, the technology herein is not limited to such connections, and is applicable for use with a variety of connector types, including but not limited to QSFP-DD, OSFP, and other types of connections.

The connectors 210a, 210b are configured to route the received data from the connections 206, 208, respectively, to an FPGA 212 on the redundant NIC card 220. In the illustrated embodiment, the connectors 210a, 210b route all of the data channels within connections 206, 208 to the FPGA 212. In other embodiments, a retimer and/or gearbox may be sit between the connectors 210a, 210b and the FPGA. Retimers and gearboxes are common networking components used to compensate for channel loss and to scale up or down the bandwidth of each channel. The FPGA enables various functions on the redundant NIC card 220, including network acceleration. In various embodiments, the FPGA 212 can be programmed to operate as a circuit switch for switching between data stream 216a (data from MOR A 202) and data stream 216b (data from MOR B 204). Pairs of pins of FPGA 212 are associated with each data stream 216a, 216b. Once set, the FPGA is capable of distinguishing between data from MOR A 202 and data from MOR B 204.

This circuit switch-style function in the FPGA 212 facilitates moving the switching responsibility between two potentially live data sources to the server-level. A similar responsibility occurs when a top of rack (TOR) switch is connected to two MOR switches in a redundant configuration, with the TOR switch having to decide when to switch between the data sources. However, the TOR switch functions as a packet switch, routing packets to various different endpoints (e.g., servers). Packet switch functions are fundamentally different from circuit switch functions. Circuit switching occurs on physical paths between a data source and a destination, whereas packet switching does not have any one specific physical path. Moreover, determining when to switch between two potentially live data sources at the packet switch level balances other factors, such as resource utilization and bandwidth availability to determine how to switch over. The circuit switch functionality of the FPGA 212 is discussed in greater detail with respect to FIGS. 7A-8B.

The output of the FPGA 212 is sent to a NIC 214 of the redundant NIC card 220, in a similar manner as known in the art. By including the switching functionality of the FPGA 212 on the redundant NIC card 220, embodiments of the present disclosure enable a single NIC to control the network interface to both MOR A 202 and MOR B 204. As illustrated, the redundant NIC card 220 is communicatively connected to the processor 222 of the server 228 through a server-side connector 218. In some embodiments, the server-side connector 218 may enable communication between the redundant NIC card 220 and the processor 222 over the peripheral component interconnect express (PCIe) communication protocol, as a non-limiting example. A person of ordinary skill in the art would understand that the technology disclosed herein is not limited to any specific communication protocol between the redundant NIC card 220 and the processor 222. The server 228 may further include storage 224 and memory 226. In various embodiments, the storage 224, memory 226, or a combination of both may store one or more configuration commands for setting the FPGA 212 of the redundant NIC card 220. In other embodiments, such configuration commands may be sent via a dedicated out-of-band management fabric. In various embodiments, the processor 222, storage 224, and the memory 226 may be similar to the components discussed with respect to FIG. 10.

Figure 3:
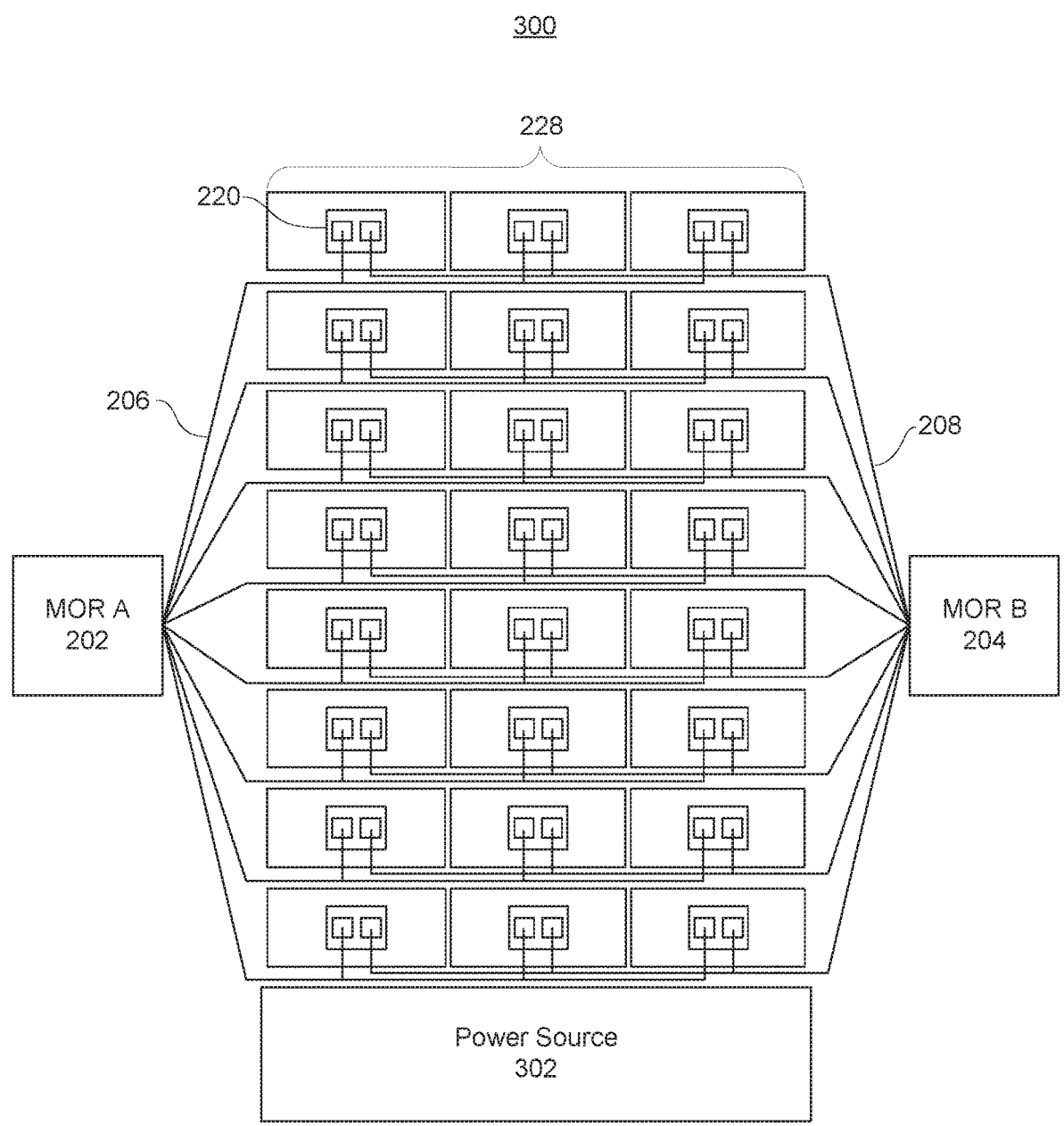
FIG. 3 illustrates an example rack-level module schematic using a redundant NIC card in accordance with embodiments of the technology disclose herein.

FIG. 3 illustrates an example rack-level module schematic 300 using a redundant NIC card 220 in accordance with embodiments of the technology disclosed herein. Common elements between figures are indicated with the same reference value. The rack illustrated comprises 24 servers 228. Each server 228 includes a redundant NIC card 220, with a separate connection 206, 208 from MOR A 202 and MOR B 204, respectively. The connections between MOR A 202 and MOR B 204 and the servers may be through AOCs in various embodiments, which may have quad small form-factor pluggable (QSFP) type hot pluggable transceivers on the terminating ends that connect each server to the MOR switches 202, 204. The servers 228 in the rack receive power from power source 302. As illustrated in FIG. 3, use of the redundant NIC card 220 allows for connections to both MOR A 202 and MOR B 204 without the need for a second NIC card in each server. This lowers the cost of each server by reducing the number of NIC cards needed, the price of which can increase exponentially when FPGAs and other components for handling higher bandwidths (e.g. 400 gigabyte Ethernet). This also saves space within each server 228, enabling for other server cards to be included, providing additional functionality, smaller form factors for server 228, or a combination of both, providing greater flexibility in network design.

There are some NIC cards available that allow for two switches to be connected through a single NIC card. However, such cards are expensive because the NIC card simply adds duplicative hardware to the same NIC card. Each connection is tied to a separate NIC. Embodiments of the present disclosure make it possible to use a single NIC card without having to have duplicative FPGA and NIC hardware components, thereby reducing the cost of such a redundant NIC card.

Although embodiments in accordance with the examples discussed with respect to FIGS. 2-3 enables use of a single redundant NIC card to provide full redundancy, the implementations still require each MOR switch 202, 204 to have a separate cable connection to each server 228. Therefore, the number of cable connections still sit at a 2:1 ratio to the number of servers 228 (e.g., 48 cable connections (24 from MOR A, 24 from MOR B) to 24 servers). To further reduce the cost of achieving full redundancy, the number of cable connections is the next hurdle.

Figure 4:
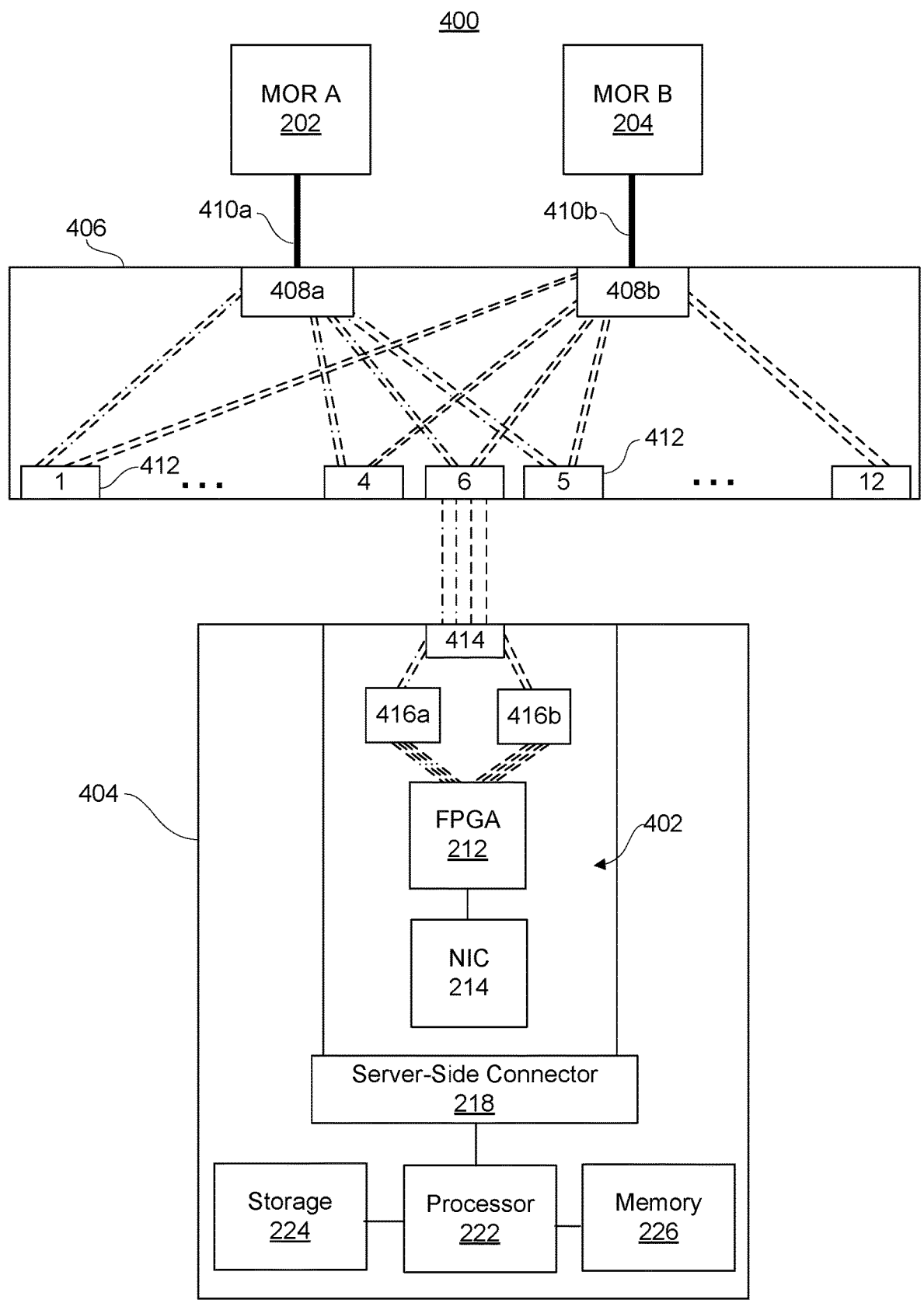
FIG. 4 illustrates another example network architecture with an example redundant NIC card in accordance with embodiments of the technology disclose herein.

FIG. 4 illustrates another example network architecture 400 with an example redundant NIC card 402 in accordance with embodiments of the present disclosure. The example network architecture 400 includes MOR A 202 and MOR B 204. Rather than having outputs to each server, MOR A 202 and MOR B 204 in FIG. 4 are connected to a media converter board 406. The media converter board 406 reduces the number of required electrical connections between the MOR switches 202, 204 and the servers. The media converter board 406 comprises media converter modules 408a, 408b. In various embodiments, media converter modules 408a, 408b may be pluggable devices, similar to other hot swap designed networking components, while in other embodiments the media converter modules 408a, 408b may be permanently affixed to the media converter board 406 (e.g., soldered to the board). In various embodiments, the media converter modules 408a, 408b may be implemented in circuitry and other hardware elements, while in other embodiments the media converter modules may be a combination of hardware and software configured to convert the optical signals into electrical signals. A person of ordinary skill in the art would understand how to implement the media converter modules in circuitry and/or software in view of this disclosure.

Each MOR switch 202, 204 is connected over a photonic cable 410a, 410b to the media converter board through media converter modules 408a and 408b, respectively. Photonic cable 410a, 410b may be similar to the photonic cables discussed with respect to FIGS. 2-3. In various embodiments, the MOR switches 202, 204 may be connected over a single photonic cable 410a, 410b, while multiple smaller photonic cables 410a, 410b may be used in other embodiments. In various embodiments, the media converter modules 408a, 408b convert the optical signals from MOR A 202 and MOR B 204, respectively, into electrical signals. In various embodiments, media converter modules 408a, 408b enable each data channel received over photonic cables 410a, 410b to be routed to separate output ports 412 of the media converter board 406. This is possible because the media converter modules 408a, 408b provides a plurality of electrical channels (e.g., 24 electrical channels corresponding to 24 received optical channels) in each direction. The level of split connectivity provided is not possible with individual quad cables. Such routing capability allows for the media converter modules 408a, 408b to provide a "shuffle" function at a much lower cost than providing a similar solution using optical shuffles.

This shuffle function allows the intermixing of signals in a manner that would not be available via industry-standard converter modules. As a non-limiting example, one channel from each media converter module 408a, 408b can be routed to the same output port. As another non-limiting example, as illustrated in FIG. 4 two channels from each media converter module 408a, 408b can be routed to the same output port. This capability greatly simplifies the mixing and matching of signals originating at various switches in order to provide a combination of those signals to a single target server via a dedicated server cable that spans between the media converter board 406 and each server 404.

As illustrated in FIG. 4, the media converter board 406 has twelve output ports 412. Although twelve output ports 412 are shown, it should not be interpreted to limit the scope of the invention. A person of ordinary skill in the art would understand that the number of output ports on the media converter board 406 may change based on the implementation. As a non-limiting example, the media converter board 406 is designed to connect with twelve servers 404, each output port 412 outputting 4 data channels (two from MOR A 202, two from MOR B 204) to each server 404.

Each output port 412 of the media converter board 406 connects to the redundant NIC card 402 of each server 404 through connector 414. In various embodiments, the connection may be made using a copper wire, such as a standard network server cable.

In various embodiments, the output ports 412 of the media converter 406 and the connector 414 may be configured to distinguish between data channels from the two different sources (MOR A 202, MOR B 204). In some embodiments, output port 412 and connectors 414 may be positionally configured, with the same pin positions on each side of the connection are associated with a specific data source. As a non-limiting example, pins 0 and 1 on the #6 output port 412 may be tied to media converter module 408a, and pins 2 and 3 on the #6 output port 412 may be tied to media converter module 408b. At connector 414 (i.e., the other end of the connection with the #6 output port 412 illustrated in FIG. 4), the same pin assignments is made. In this way, the data channels are positionally determined. Moreover, by tying the pinouts in this way, the issue of mis-cabling of the servers is mitigated.

In various embodiments, the connector 414 of redundant NIC card 402 routes the data channels from MOR A 202 and MOR B 204 to different processing pipelines 416a, 418a respectively. In various embodiments, the received data channels may need to be processed prior to being sent to the FPGA 212. As a non-limiting example, the data channels received by the connector 414 may be 50 gigabyte channels, but the FPGA 212 may be designed to handle 25 gigabyte channels. Therefore, the data channels may need to be processed to turn the 50 gigabyte channels into 25 gigabyte channels.

With respect to the present disclosure, the term "processing pipelines" is used in a general sense to refer to components placed between the connector 414 and the FPGA 212. In some embodiments the data channels received by the connector 414 are not in a condition usable by the FPGA 212. Routing the data channels through one or more components configured to transform the data channel into a form suitable for the FPGA may be needed. In various embodiments, the processing pipelines 416a, 416b may comprise one or more of retimers and/or gearboxes. In other embodiments, the processing pipelines may include processing components, such as, for example, an ASIC. In some embodiments, the redundant NIC card 402 may exclude processing pipelines 416a, 416b, such as where the data channels expected through the connector 414 are already the proper size for use by the FPGA 212.

Following processing through processing pipelines 416a, 416b, the FPGA 212 is configured such that the data channels from one source (e.g., MOR A 202) is considered the primary communication path, and the second source (e.g., MOR B 204) is considered the secondary communication path. In a similar manner as discussed with respect to FPGA 212 of FIG. 2, the FPGA 212 of the redundant NIC card 402 can distinguish between each source and sense when data is present on the associated pins of the FPGA 212. Following the processing pipeline 416a, 416b, the operation of the redundant NIC card 402 is similar to the operation discussed with respect to FIGS. 2-3.

Although the media converter board 406 is illustrated as being built into the server rack in a horizontal position, this is only one way in which media converter board 406 may be implemented. A person of ordinary skill in the art would understand that the media converter board 406 may be positioned in various ways. As a non-limiting example, the media converter boards 406 may be implemented in a vertical implementation, configured to be integrally positioned between the upright support rails or posts of a server rack on the left and right sides of the server rack.

Figure 5:
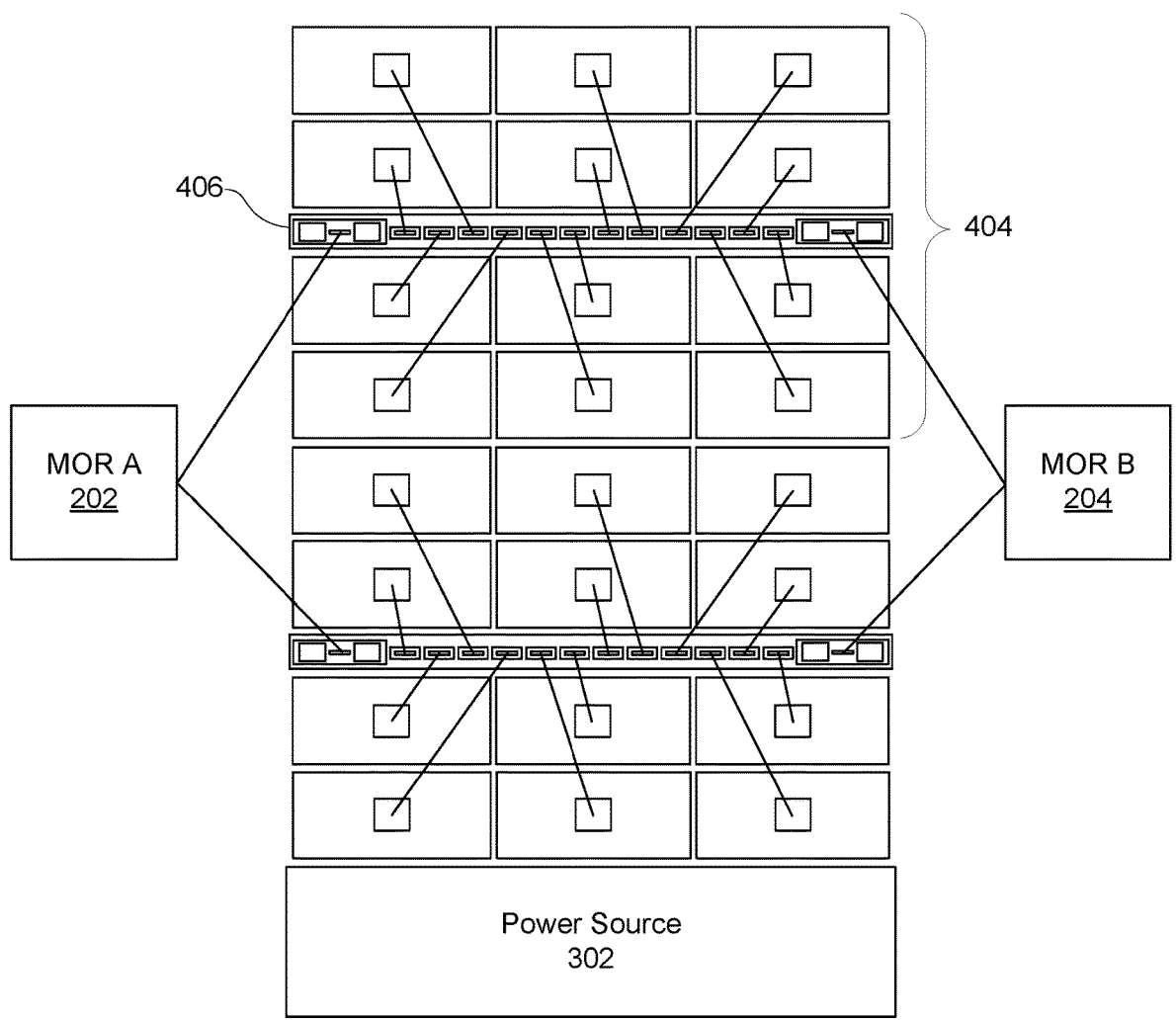
FIG. 5 illustrates another example rack-level module schematic using a redundant NIC card in accordance with embodiments of the technology disclose herein.

FIG. 5 is an example rack-level module schematic 500 using a redundant NIC card 402 in accordance with embodiments of the technology disclosed herein. As discussed with respect to FIG. 4, each media converter board 406 includes twelve output ports. Accordingly, each media converter board 406 is capable of servicing twelve servers 404. As can be seen, implementing a redundant NIC card 402 can drastically reduce the number of cables required to provide full redundancy. As illustrated in FIG. 3, implementing a redundant NIC card 220 would still requires 48 cable connections from the MOR switches 202, 204, if standard QSFP optical cables were used, each of those connections being an optical connection.

As illustrated in FIG. 5, implementing a redundant NIC card 402 cuts the number of cables needed to connect to all the servers is cut in half. These connections can also use less expensive copper wires from the media converter board 406 to the connector 414 of the redundant NIC card 402 of the servers 404, as opposed to the optical cables required for direct connection of the MOR switches 202, 204. The example schematic 500 further reduces the number of photonic cables necessary to provide a connection from the MOR switches 202, 204 to an entire rack of server 404. As illustrated in FIG. 5, each MOR switch 202, 204 needs to connect with the media converter boards 406 rather than with each server 404. In the example schematic 500, the connection between the MOR switches 202, 204 and the media converter boards 406 implements the 24-channel photonic technology. In such embodiments, the MOR switches 202, 204 may employ coarse wavelength division multiplexing (CWDM) photonics technology, which utilizes four colors to produce four electrical channels per optical connection. In other embodiments, the MOR switches 202, 204 may utilize other photonics technology, such as but not limited to dense wavelength division multiplexing (DWDM) technologies, pulse amplitude modulation (PAM)-4 and PAM-8 technologies, or any photonic technologies suitable for providing multiple electrical channels from a single input fiber or fiber bundle. Various other high-density optical connections may be used in other embodiments, increasing the number of data channels available to the media converter board. In various embodiments, single channel connections may us to connect the MOR switches 202, 204, to the media converter board 406.

In the illustrated embodiment, the number of connections from the MOR switches 202, 204 is reduced by a factor of 12, requiring only 4 cables (two from each MOR switch 202, 204) to provide full redundancy for 24 servers 404. The extent of reduction depends on the data rate ratio per optical connection. A person of ordinary skill in the art would understand that the technology disclosed herein is applicable to any MOR-to-rack architecture. Even if the data rate ratio per optical connection is 1-to-1, a person of ordinary skill would understand that embodiments of the technology disclosed herein still enable a single NIC to handle communication to both MOR switches, reducing the total number of NICs and/or NIC cards required in the servers.

A person of ordinary skill in the art would understand that the reduction factor for schematic 500 is one example, and that the reduction factor will depend based on the implementation. For example, where the data rate ratio per optical connection decreases (i.e., more cables from the MOR switches are needed to provide the same number of channels), the number of servers a single media converter board can service may also decrease. As another example, the number of connections and media converter boards required may vary depending on the target bandwidth of the NIC. In the illustrated examples of FIGS. 4 and 5, the target bandwidth for the NICs in each server is assumed to be 100 gigabytes/second, and each data channel output by the media converter board is 50 gigabytes. If the target bandwidth was 200 gigabytes/second, each media converter board would need to output two more data channels from each media converter module, reducing the number of output puts from twelve to six. Accordingly, two additional media converter boards would be necessary to service all 24 servers. A person of ordinary skill in the art would understand how the requirements of a specific implementation will impact the benefits achieved by embodiments of the technology disclosed herein.

As a non-limiting example of embodiments in accordance with FIGS. 4-5, assume that the MOR switches 202, 204 each output via modules providing 24 optical channels running at 50 gigabytes. Therefore, each media converter module 408a, 408b receives 24 optical channels over the photonic cables connecting MOR switches 202, 204 with the media converter board 406. Each media converter module 408a, 408b converts each of the 24 optical channels into 24 electrical channels running at 50 gigabytes. As the media converter board 406 is configured to connect to twelve servers, the media converter modules 408a, 408b can allocate two channels from each source (MOR A 202, MOR B 204) to each output port 412 of the media converter board 406. As illustrated, the #6 output port 412 is connected to the connecter 414 of the redundant NIC card 402, in various embodiments through a copper cable, and receives two data channels running at 50 gigabytes from MOR A 202 and two data channels running at 50 gigabytes from MOR B 204. The connector 414 distinguishes between the two sources, sending each pair of data channels to different processing pipelines 416a, 416b. Assuming the FPGA 212 is configured to operate most efficiently with data channels at 25 gigabytes, the processing pipelines 416a, 416b can convert the two 50 gigabyte data channels into four 25 gigabyte data channels. The four 25 gigabyte data channels from each source are sent to the FPGA 212. The FPGA is configured to distinguish between a primary communication path and a standby communication path, and to sense when each communication path is operational (i.e., there is data on the communication path). The FPGA may be configured to switch between the primary and standby communication paths when a MOR switch failure occurs in the network.

Figure 6:
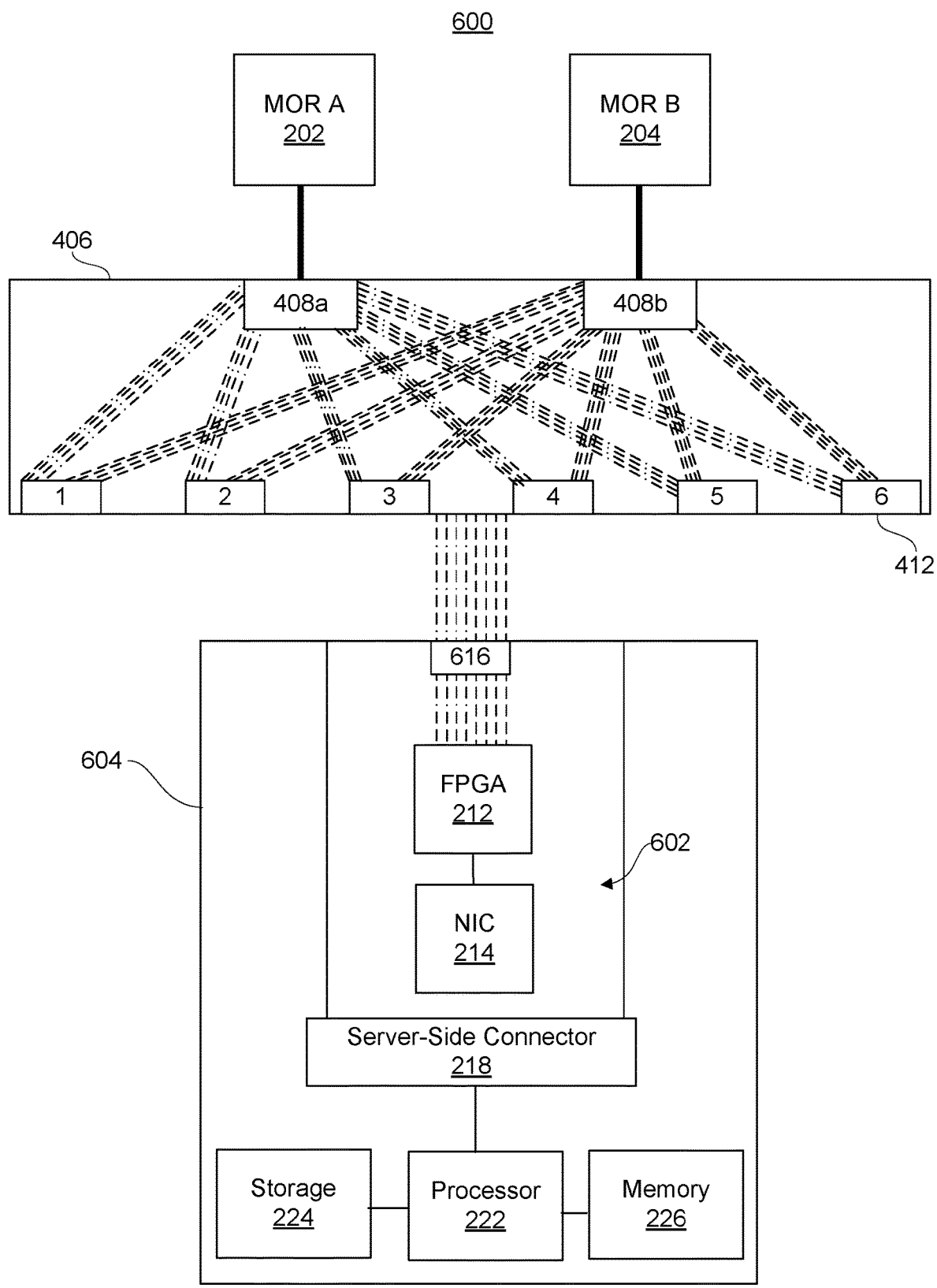
FIG. 6 illustrates another example network architecture with an example redundant NIC card in accordance with embodiments of the technology disclose herein.

FIG. 6 illustrates another example network architecture 600 with an example redundant NIC card 402 in accordance with embodiments of the present disclosure. The example network architecture 600 is similar to the example network architecture 400 discussed with respect to FIG. 4. Referring to FIG. 6, the redundant NIC card 602 is configured for 200 gigabyte connections. Similar to FIG. 4, the MOR switches 202, 204 provide multiple twenty-four optical 50 gigabyte data channels, which are converted into twenty four electrical 50 gigabyte data channels by the media converter modules 408a, 408b. The media convertor modules 408a, 408b send four 50 gigabyte data channels to each of the output ports 412, outputting a total of 8 data channels, four originating at MOR A, and four originating at MOR B to each server 604. The connector 616 receives the 8 data channels and proceeds to feed the data channels to the FPGA 212 directly. Because the redundant NIC card 602 is set for an aggregate 200 gigabytes, the FPGA 212 may be configured to process 50 gigabyte data channels and to switch between the four paths from MOR A and the four paths from MOR B in the manner previously described.

The examples illustrated in FIGS. 2-6 are provided for purposes of explanation of the subject matter disclosed herein, and should not be interpreted as limiting the scope of the subject matter in any way. A person of ordinary skill in the art would understand that the number of data channels, output ports of the media converter board, and other parameters will be dictated by the specific requirements of an implementation.

Figure 7A:
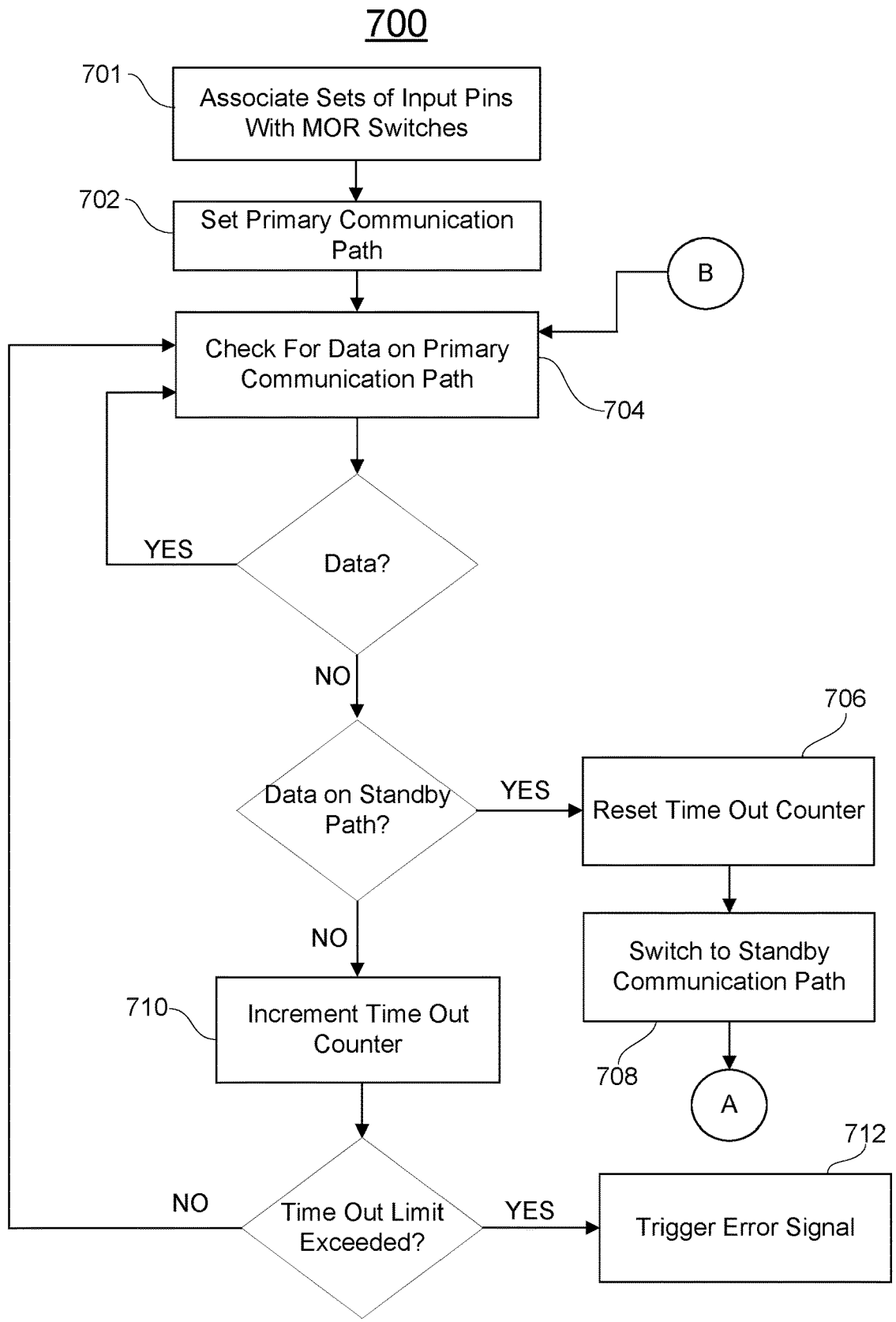
FIGS. 7A and 7B illustrate an example method in accordance with various embodiments of the technology disclosed herein.
Figure 7B:
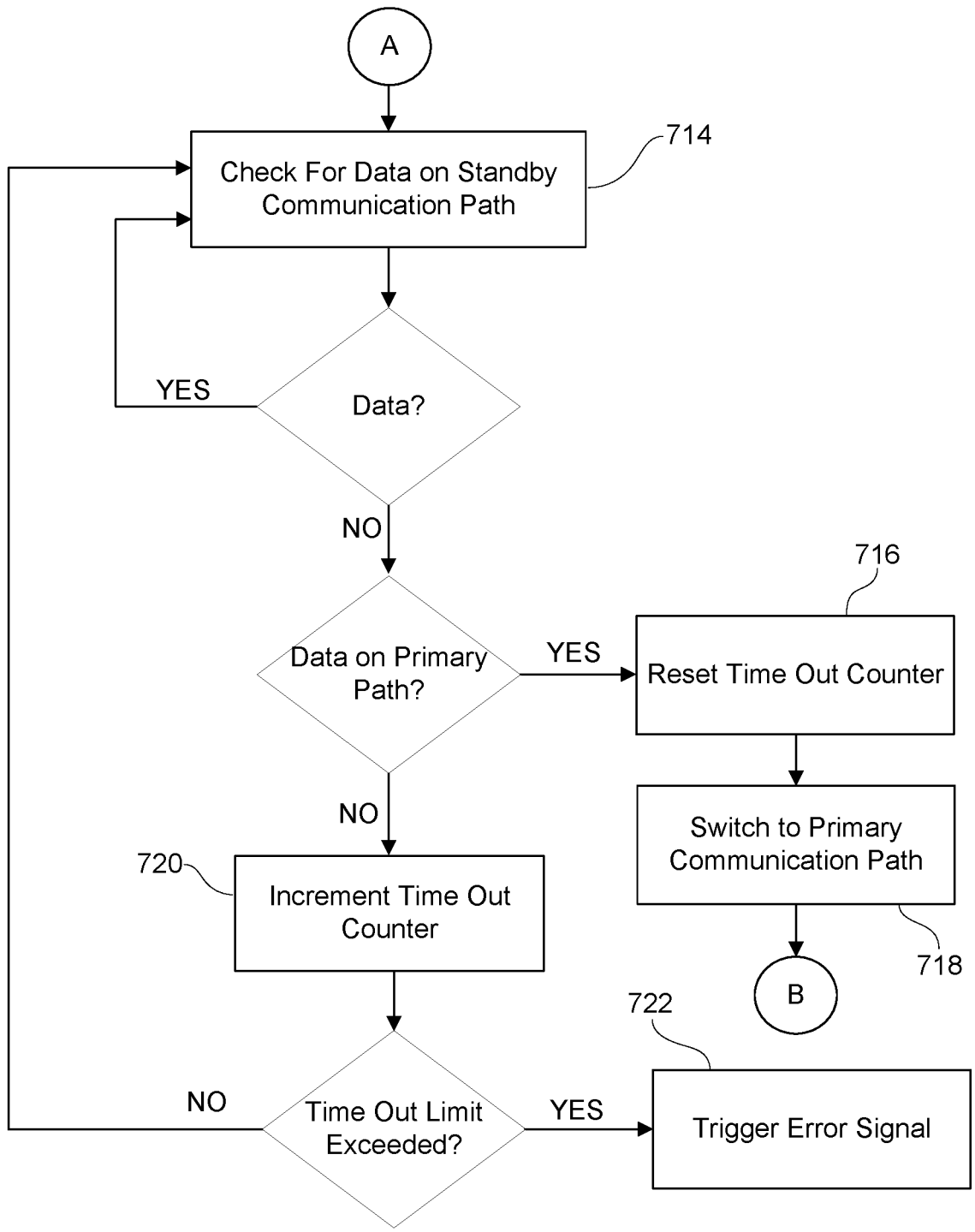

FIGS. 7A and 7B illustrate an example method 700 in accordance with embodiments of the technology of the present disclosure. In various embodiments, method 700 may be performed by a processing device on a NIC card of a server. Non-limiting examples of processing devices include one or more: FPGAs; processors; controllers; application specific integrated circuits (ASICs); programmable logic arrays (PLAs); programmable array logic (PALS); complex programmable logic devices (CPLDs); among others. For ease of discussion, the technology disclosed herein will be described with respect to an FPGA. Although described so, a person of ordinary skill in the art would understand that the technology is not limited solely to an FPGA and can be implemented using a variety of processing approaches.

Referring to FIG. 7A, a first set of input pins and a second set of input pins of the FPGA are associated with MOR switches at operation 701. In various embodiments, associating comprises tying a first set of input pins to electrical traces associated with a first MOR switch, and tying a second set of input pins to electrical traces associated with a second MOR switch. The electrical traces may connect the sets of pins to separate processing pipelines (such as those discussed with respect to FIG. 4) in some embodiments, while in other embodiments the electrical traces may connect the sets of pins with a connector (such as discussed with respect to FIG. 6). In various embodiments, the electrical traces connect the first set of input pins to a first connector and the second set of input pins to a second connector (such as the connectors discussed with respect to FIG. 2).

At operation 702, the primary communication path is set. In various embodiments, setting the primary communication path may comprise connecting the first set of input pins to a set of output pins of the FPGA, the set of output pins connected to a NIC. The second set of input pins may also be designated as a standby communication path at operation 702. Connecting the first set of input pins with the set of output pins facilitates routing the data channels from the first MOR switch to the NIC. In various embodiments, setting the primary communication path comprises apply a high priority level to the first set of input pins and a low priority to the second set of input pins. The processing device (e.g., FPGA, ASIC, processor, etc.) can determine the set of input pins which should be connected to a set of output pins based on the priority assigned.

At operation 704, the FPGA checks for readable and useful data on the primary communication path. Readable and useful data comprises the real data (e.g., data packets meeting the respective communication protocol standard) on the data channel, excluding noise. For example, a port on a MOR switch or media converter board may fail in a manner that results in only half the required differential electrical signal for a given data channel. Although the FPGA may sense activity on the respective input pins, the channel cannot be used for data transmission. In various embodiments, the FPGA continually senses the first set of input pins to determine whether there is data on the pins. In other embodiments, a processor (e.g., a processing unit, microcontroller, etc.) may be used, and software and/or firmware may be stored on a memory or storage component connected to the processor that, when executed, polls the set primary communication path asking if data is present. If readable and useful data is sensed on the primary communication path, the FPGA and/or other processing device loops back and continues to check for data on the primary communication path.

If no readable and useful data is sensed on the primary communication path, a determination is made as to whether there is readable and useful data on the standby path. If there is readable and useful data sensed on the standby communication path, a time out counter is reset at 706, and the FPGA and/or other processing component switches to the standby communication path at operation 708, disconnecting the first set of input pins (associated with the primary communication path) from the set of output pins and connecting the second set of input pins to the set of output pins. The process following a switch to the standby communication path is discussed with respect to FIG. 7B.

In various embodiments, if no data is detected on the primary communication path, and no data is detected on the standby communication path, a time out count is incremented at operation 710. A time out counter helps avoid an endless loop where the redundant NIC card is continually trying to find a connection. In various embodiments, a time out limit is set, which determines when more retries seem futile. If the time out counter after incrementing at operation 710 exceeds the time out limit, in various embodiments an error signal may be triggered at operation 712. In various embodiments, the error signal may be an error notification sent to a management utility over an out of band communication channel (e.g., a management port of the server). In some embodiments, the error signal may trigger one or more visual indicators on the affected server, built into or affixed to one or more supports of the rack, or a combination of both. Non-limiting examples of visual indicators include status lights (e.g., LEDs) on an exterior surface of a server, status lights on the server rack and connected to the affected server, display on the server, or other visual indicators. In various embodiments, an auditory indicator may be triggered, such as an alarm or recorded or simulated verbal warning, among others.

If the time out counter does not exceed the time out limit, the process loops back to operation 704. In this way, the process enables for multiple tries before triggering an error message, in case there was simply a lull in the communication from the sources (i.e., MOR A and MOR B of FIGS. 2-6).

FIG. 7B illustrates the process following a switchover to the standby communication path. After switching over, a similar process as discussed with respect to the primary communication path of FIG. 7A. Accordingly, to the extent the operation is similar or the same as operations or decisions of FIG. 7A, the same discussion applies to the similar operations and decisions in FIG. 7B. At operation 714, the FPGA and/or processor checks for data on the secondary communication path. At operation 716, when no data is sensed on the standby communication path but there is data sensed on the primary communication path, the time out counter is reset, and a switch to the primary communication path occurs at operation 718. The method 700 than loops back to operation 704 of FIG. 7A. When no data is sensed on either communication path, the time out counter is incremented at 720, and if the time out limit is exceeded an error signal is triggered at operation 722. If the time out limit is not exceeded, the method 700 loops back to operation 714 and runs through the operations again.

In some cases, the MOR switch associated with the primary communication path may still be operational, but not transmitting any data. It may be desirable in some embodiments to account for this within the switching logic of the FPGA and/or processing components of the redundant NIC card. Absent some mechanism, it is possible that the system may switch to the standby communication path or trigger an error signal without an actual issue to the primary communication path MOR switch.

Figure 8A:
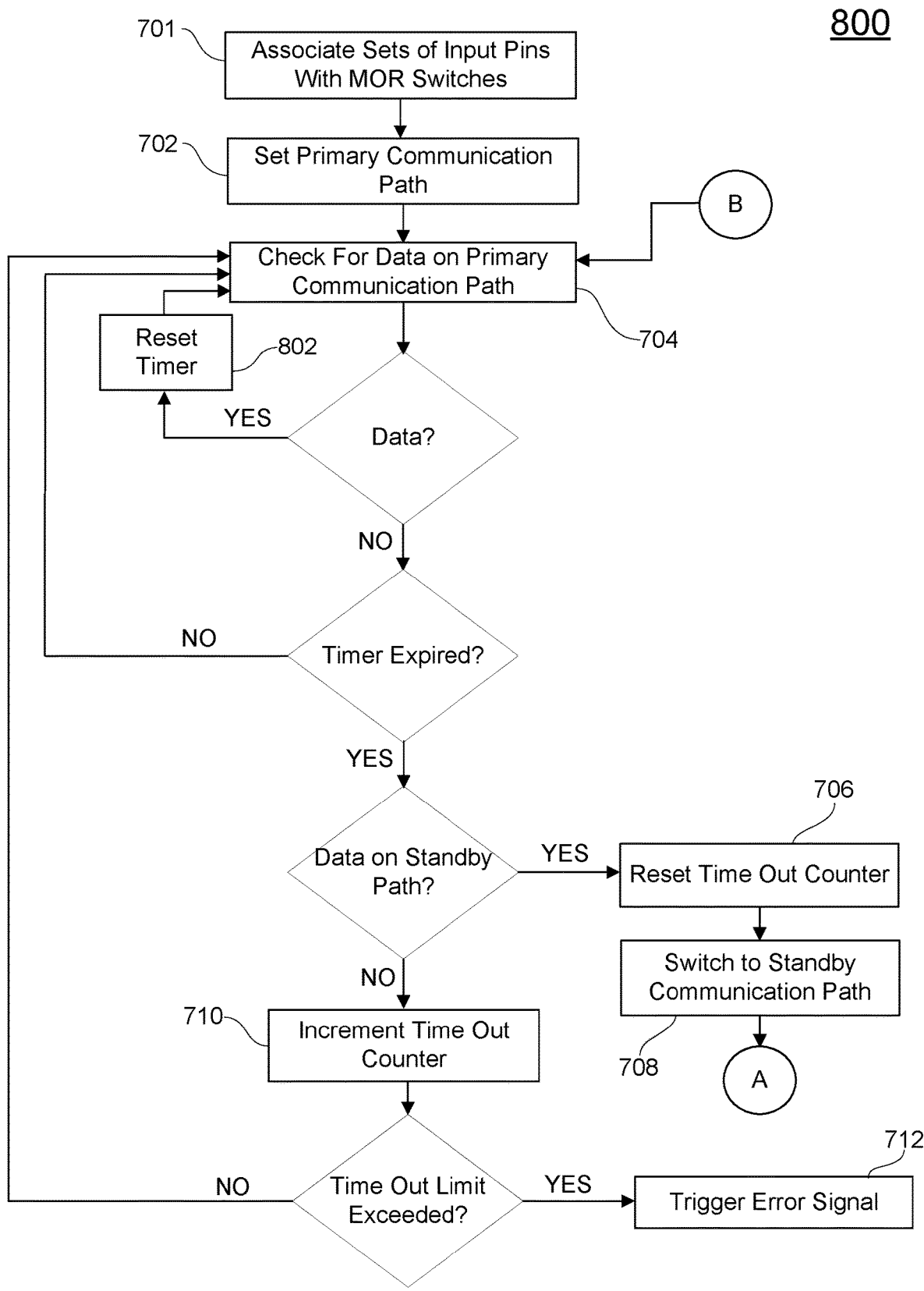
FIGS. 8A and 8B illustrate another example method in accordance with embodiments of the technology disclosed herein.

FIG. 8 illustrates another example method 800 in accordance with embodiments of the technology disclosed herein. In the illustrated method 800, a timer is used to account for potential lapses in data transmission over the communication paths. The timer can be set for a period of time, to allow for several attempts to detect data on the active communication path before checking to see whether a switchover is possible (as data on the other communication path would indicate an issue with the active communication path). The majority of the operations are the same in method 800 and in method 700 discussed with respect to FIGS. 7A and 7B. As shown in FIG. 8A, if the FPGA and/or processor determines that there is data on the primary communication path, the timer is reset at operation 802. Because data was detected, there is no lapse in transmission so resetting the timer ensures that the FPGA and/or processor takes the entire designated delay before moving on to check if the standby communication path has data. After resetting the timer at operation 802, the method 800 loops back to operation 704.

If no data is detected on the primary communication path, the FPGA and/or processor determines whether the timer has expired. If the timer has not expired, the method 800 loops back to operation 704. While the timer is still active, the FPGA and/or processor continues to check the primary communication path for data, providing a delay to account for occasionally lapses in data transmission. If the timer has expired, the method 800 moves on to deciding whether the standby communication path has data. If so, the method 800 proceeds similar to the method 700 discussed with respect to FIGS. 7A and 7B.

Figure 8B:
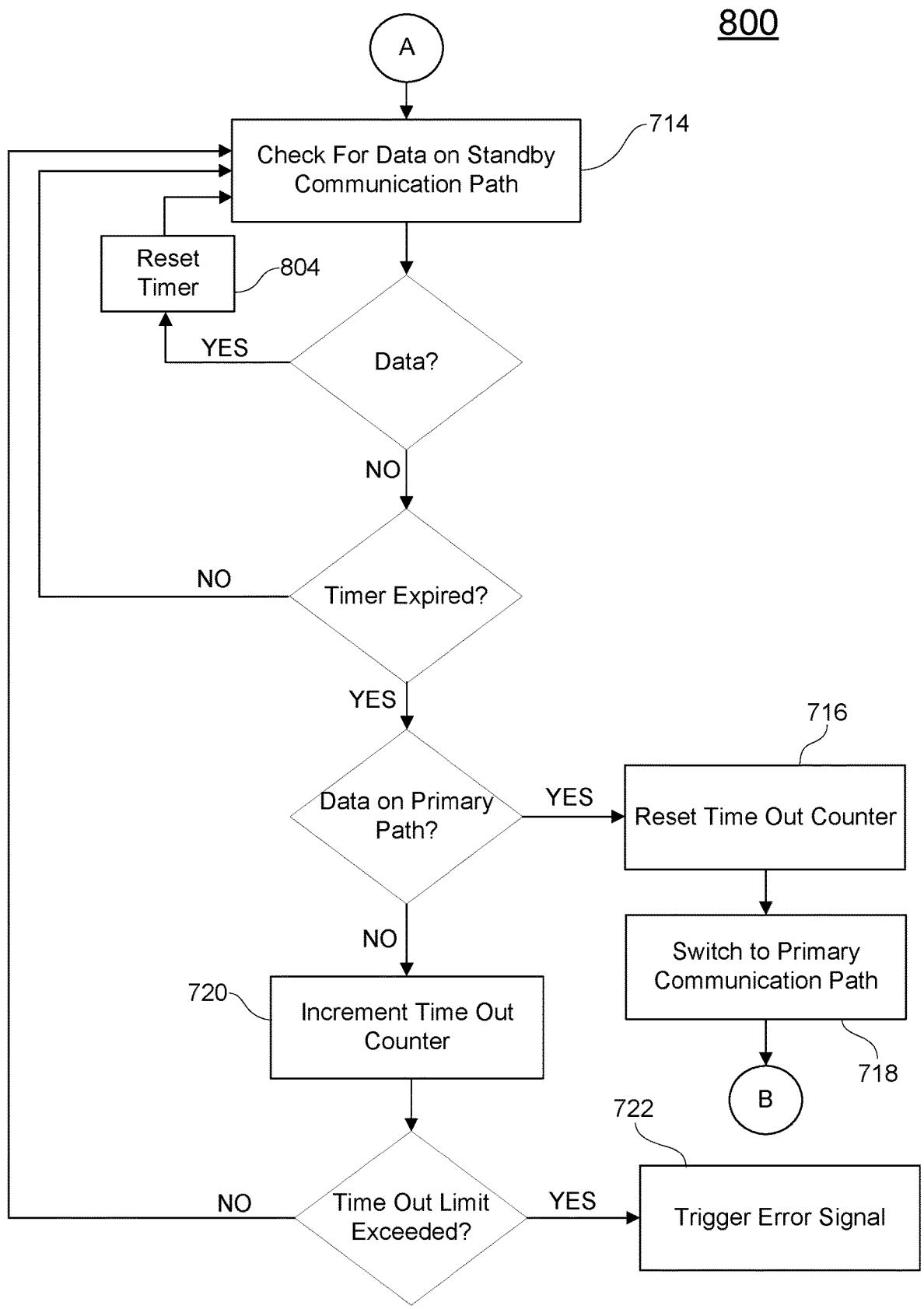

As illustrated in FIG. 8B, a similar timer function is added to the process related to the standby communication path.

Implementing embodiments of the technology discussed in the present disclosure greatly reduces the cost of implementing full redundancy. The technology disclosed herein allows for a fully redundant server-level configuration using a single NIC card with a single NIC, rather than two NIC cards or a single NIC card with two NICs on it. By implementing a circuit switch-style function within an FPGA on the redundant NIC card, the present disclosure allows for data channels from two redundantly configured, separate data sources (e.g., MOR switches) to be processed using a single NIC on a single NIC card. This greatly reduces the hardware requirements for full redundancy, both with respect to server design (with the saved space from using only one NIC card and/or lower power consumption using only one NIC) and cabling (drastically reducing the number of cables necessary to connect a fully redundant architecture).

Figure 9:
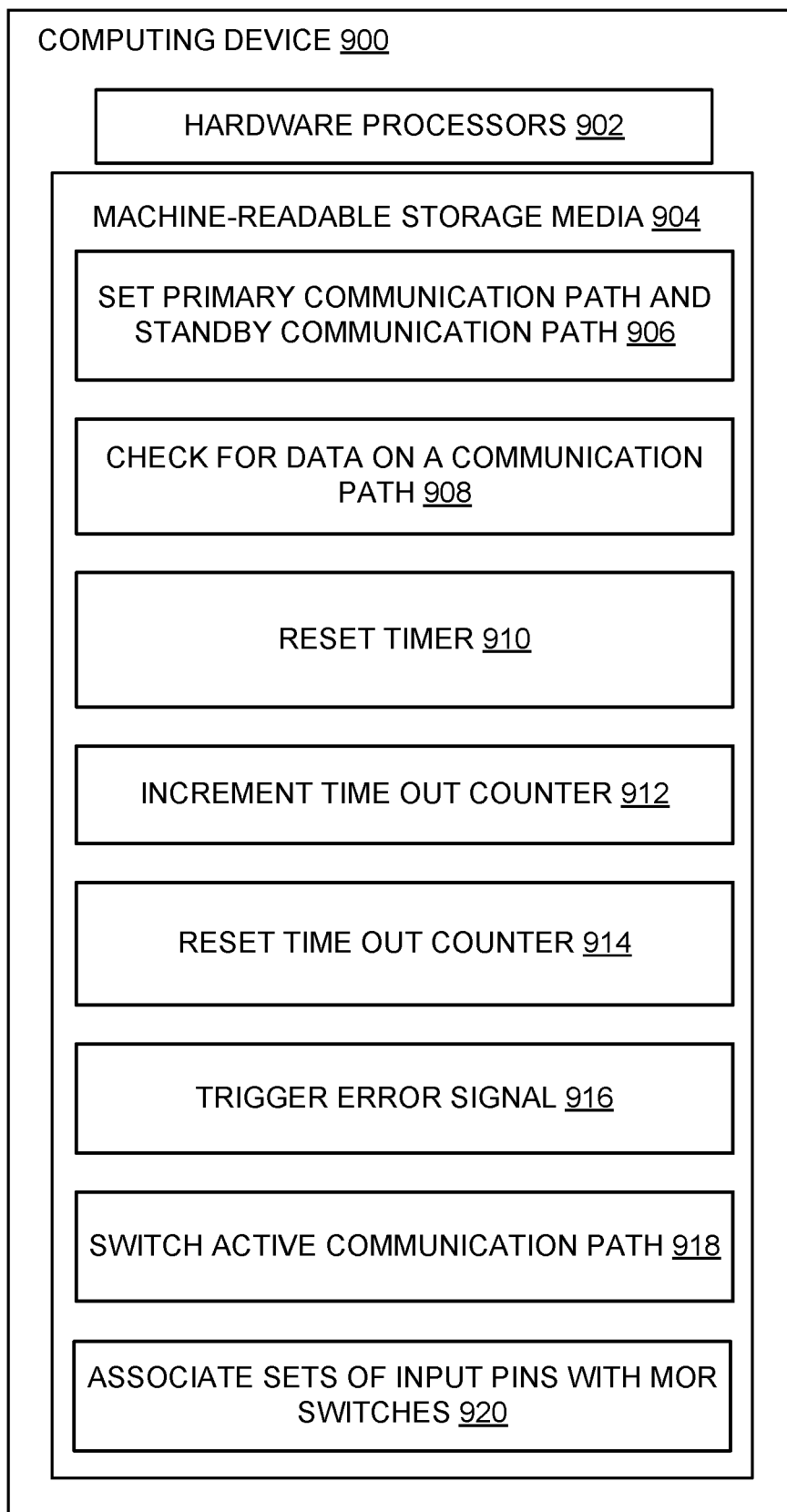
FIG. 9 illustrates an example computing device in accordance with embodiments of the technology disclosed herein.

FIG. 9 is an example computing device 900 in accordance with embodiments of the present disclosure. In various embodiments, the computing device 900 may be similar to the servers discussed with respect to FIGS. 2-8B. Where operations and functionality of computing device 900 are similar to those discussed with respect to FIGS. 1-8B, the description of those operations and functionality should be interpreted to apply. Computing device 900 includes hardware processors 902. In various embodiments, hardware processors 903 may be similar to the processors discussed above with respect to FIGS. 2-8B. In various embodiments, hardware processors 902 may include one or more processors.

Hardware processors 902 are configured to execute instructions stored on a non-transitory machine-readable medium 904. Machine readable medium 904 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 904 may include various sub-instructions for performing the function embodied by the identified functions. For example, the instruction "Set Primary Communication Path and Standby Communication Path" 906 may include various sub-instructions for setting the primary communication path and the standby communication path, as discussed with respect to FIGS. 2, 4, and 6-8B.

The instruction "Check for Data on a Communication Path" 908 may include various sub-instructions for identifying if there is data on a communication path, as discussed with respect to FIGS. 7A-8B. In various embodiments, the sub-instructions may include different sub-instructions for checking a primary communication path and a standby communication path, while in other embodiments the same sub-instructions apply for checking both communication paths. Checking for data on the communication path may further include sub-instructions for polling or requesting information regarding operation of the communication paths.

The instruction "Reset Timer" 910 may include sub-instructions to reset a delay timer if data is detected on the active communication path, as discussed with respect to FIGS. 8A-8B. The instruction "Increment Time Out Counter" 912 may include sub-instructions to increase a counter each time no data is detected on either communication path, as discussed with respect to FIGS. 7A-8B. The instruction "Reset Time Out Counter" 914 may include sub-instructions to reset the time out counter when a switch between communication paths is performed.

The instruction "Trigger Error Signal" 916 may include sub-instructions for triggering one or more error notifications as discussed with respect to FIGS. 7A-8B. In various embodiments, the sub-instructions may include instructions to activate one or more visual indicators associated with the server, one or more auditory indicators associated with the server, transmit an error notification to an out of band management module, or a combination thereof.

The instruction "Switch Active Communication Path" 918 may include sub-instructions for changing the set of input pins connected to an output to a NIC, as discussed with respect to FIGS. 7A-8B.

The instruction "Associate Sets of Input Pins With MOR Switches" 920 may include sub-instructions for tying input pins of a processing device to electrical traces of the NIC card, as discussed with respect to operation 701 of FIGS. 7A-8B.

Although the technology disclosed herein has been discussed with respect to MOR switches and NIC cards with FPGAs, these embodiments are merely examples and do not limit the scope of the subject matter. A person of ordinary skill in the art would understand that the technology is applicable to other network devices, such as leaf switches, spine switches, core switches, among other devices. Moreover, a person of ordinary skill in the art would understand the technology as applicable with various NIC cards not including an FPGA, but instead a different processing devices, such as an ASIC, microcontroller, among others. None of the examples should be interpreted as limiting the scope of the technology solely to those implementations.

Figure 10:
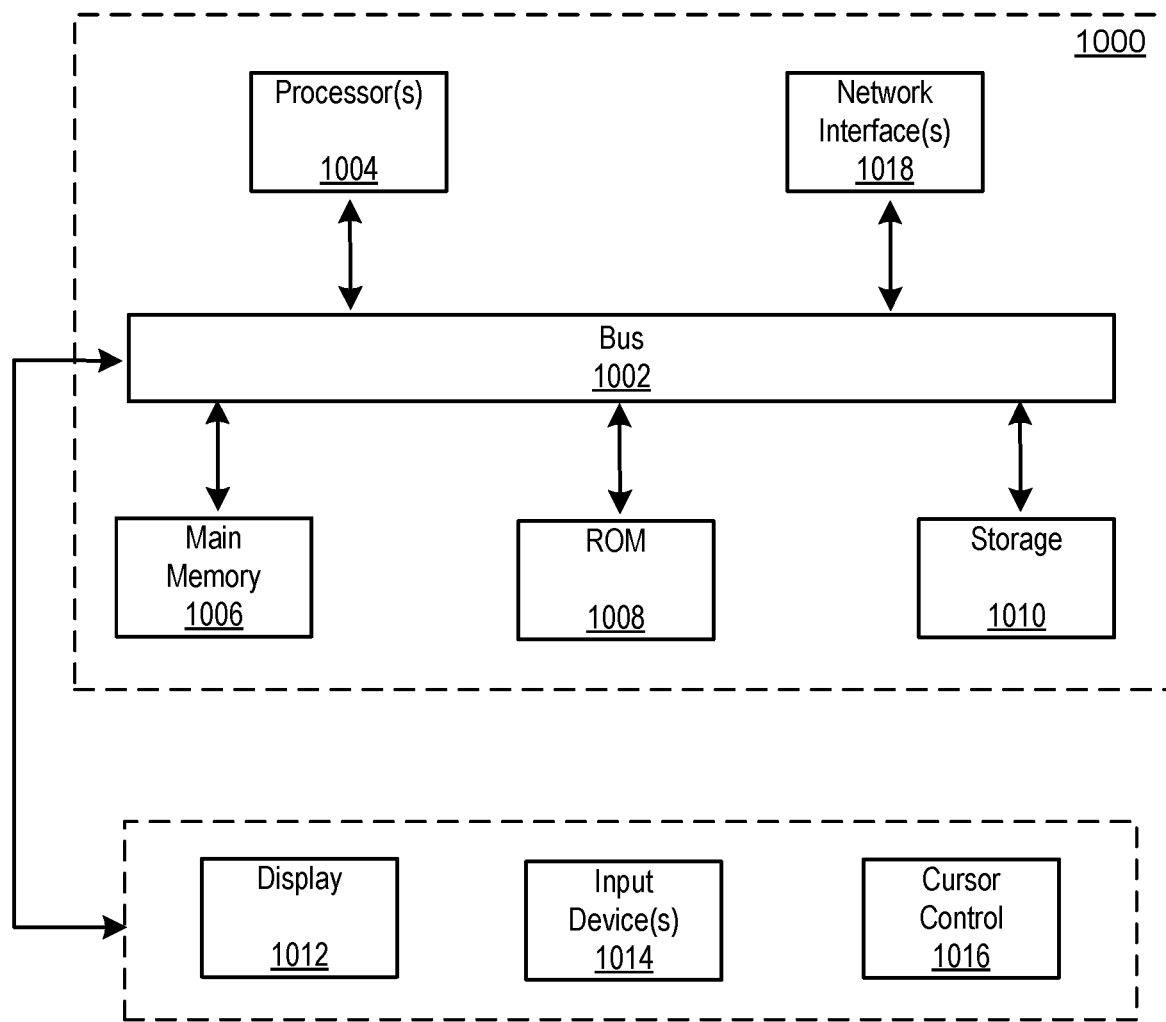
FIG. 10 is an example computing system in which embodiments described in the present disclosure may be implemented.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. In various embodiments, the redundant NIC cards discussed in the present disclosure are part of the network interface 1018. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network (s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

In common usage, the term "or" can have an inclusive sense or exclusive sense. As used herein, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusive" and "A or B but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:

associating, by a processing device, a first set of input pins of the processing device with a first network-switch and a second set of input pins with a second switch;

setting a primary communication path by communicatively connecting the first set of input pins with a set of output pins;

checking, by the processing device, for a first stream of readable and useful data from the first switch on the primary communication path;

in response to determining no readable and useful data is on the primary communication path, checking, by the processing device, for a second stream of readable and useful data from the second switch on a standby communication path, the standby communication path comprising the second set of input pins;

switching, by the processing device, to the standby communication path when the second stream of readable and useful data is detected, switching comprising performing a circuit switch action by disconnecting the first set of input pins from the set of output pins and communicatively connecting the second set of input pins with the set of output pins; and incrementing a time out counter when neither the first stream of readable and useful data nor the second stream of readable and useful data are detected.

2. The method of claim 1, further comprising:

determining, by the processing device, if the time out counter exceeds a time out limit; and triggering, by the processing device, an error signal if the time out limit is exceeded.

3. The method of claim 2, wherein the error signal comprises one or more of: a visual indicator; an auditory indicator; an error notification; or a combination thereof.

4. The method of claim 1, further comprising resetting, by the processing device, the time out counter when the second stream of readable and useful data is detected on the standby communication path.

5. A system, comprising:

a primary switch and a standby switch;

a media converter board connected to the primary switch and the standby switch;

at least one server comprising:

a network interface controller (NIC) card having a single NIC, a single processing device, and a connector for connecting the NIC card to the media converter board;

a set of output pins of the processing device are communicatively connected to an input of the NIC; and wherein the processing device is configured to perform a circuit switch action by switching a connection between a first set of input pins and a second set of input pins with the set of output pins such that a different stream of readable and useful data is output to the NIC;

wherein the primary switch and the standby switch provide redundant streams of readable and useful data, and the processing device is configured to perform a circuit switch action when a failure occurs on the primary switch but the standby switch is operable, the circuit switch action comprising switching the connection between the first set of input pins and the set of output pins to the second set of input pins and the set of output pins.

6. The system of claim 5, wherein the media converter board comprises two or more media converter modules, each media converter module configured to convert a plurality of optical data channels received from the primary switch and the standby switch into a plurality of electrical data channels.

7. The system of claim 6, wherein at least one media converter module connected to the primary switch over a first optical cable and at least one media converter module connected to the standby switch over a second optical cable.

8. The system of claim 6, the two or more media converter modules configured to route at least one electrical data channel associated with the primary switch and at least one electrical data channel associated with the standby switch to an output port of the media converter board.

9. The system of claim 8, wherein the output port combines the at least one electrical data channel associated with the primary switch and the at least one electrical data channel associated with the standby switch and transmits the combined electrical data channels over a cable connected between the output port and the connector of the NIC card of the server.

10. The system of claim 5, the NIC card further comprising two processing pipelines connected to the connecter, wherein the connector is configured to send one or more electrical data channels associated with the primary switch to a first processing pipeline and one or more electrical data channels associated with the standby switch to a second processing pipeline.

11. The system of claim 10, first processing pipeline and/or the second processing pipeline comprises one or more of: retimers; gear boxes; or a combination of both.

12. The system of claim 5, the processing device comprising a field-programmable gate array (FPGA), the FPGA configured according to non-transitory machine-readable instructions stored on a non-transitory storage medium that, when executed, configured the FPGA to:

setting a primary communication path by communicatively connecting the first set of input pins with the set of output pins;

checking for one or more electrical data channels associated with the primary switch on the primary communication path;

in response to determining no readable and useful data is on the primary communication path, checking for one or more electrical data channels associated with the standby switch on a standby communication path, the standby communication path comprising the second set of input pins; and switching to the standby communication path when the one or more electrical data channels associated with the standby switch are detected, switching comprising performing a circuit switch action by disconnecting the first set of input pins from the set of output pins and communicatively connecting the second set of input pins with the set of output pins.

* * * * *